United States Patent [19]

Andrew et al.

[11] 3,876,854

[45] Apr. 8, 1975

[54] METHOD OF ASSEMBLING PIVOT JOINTS

[75] Inventors: John R. Andrew, Columbus; Victor R. McEowen, Worthington, both of Ohio

[73] Assignee: The Columbus Auto Parts Company, Columbus, Ohio

[22] Filed: Dec. 20, 1973

[21] Appl. No.: 426,490

Related U.S. Application Data

[63] Continuation-in-part of Ser. No. 357,396, May 4, 1973, abandoned.

[52] U.S. Cl. .................... 219/91; 29/497.5; 219/79; 219/107; 219/109
[51] Int. Cl. ........................................... B23k 11/00
[58] Field of Search ......... 219/91, 107, 78, 89, 150, 219/152, 109, 104, 108, 110, 79; 29/497.5

[56] References Cited
UNITED STATES PATENTS

| | | | |
|---|---|---|---|
| 2,841,691 | 7/1958 | Rockafellow | 219/108 |
| 2,864,935 | 12/1958 | Johnson et al. | 219/78 |
| 3,132,237 | 5/1964 | Pribonic | 219/107 |
| 3,375,345 | 3/1968 | Schweller | 219/78 X |
| 3,417,221 | 12/1968 | Hayward | 219/109 |
| 3,441,708 | 4/1969 | Gilbert | 219/108 |
| 3,609,285 | 9/1971 | Scarpelli | 219/109 |
| 3,632,956 | 1/1972 | Herbst | 219/109 |

*Primary Examiner*—Bruce A. Reynolds
*Attorney, Agent, or Firm*—Palmer Fultz, Esq.

[57] ABSTRACT

A method for assembling pivot joints at high rates of production which include a precisely controlled internal end motion dimension notwithstanding variations in the dimensions of the components. The method is characterized by a preliminary gauging step which automatically determines variations in dimensions of the components which are subsequently to be fed to a welding apparatus adapted to effect closure of the pivot joints. The method is further characterized by the step of proportionally controlling burn-down rates in the welding apparatus so as to constantly effect such controlled internal end motion.

6 Claims, 7 Drawing Figures

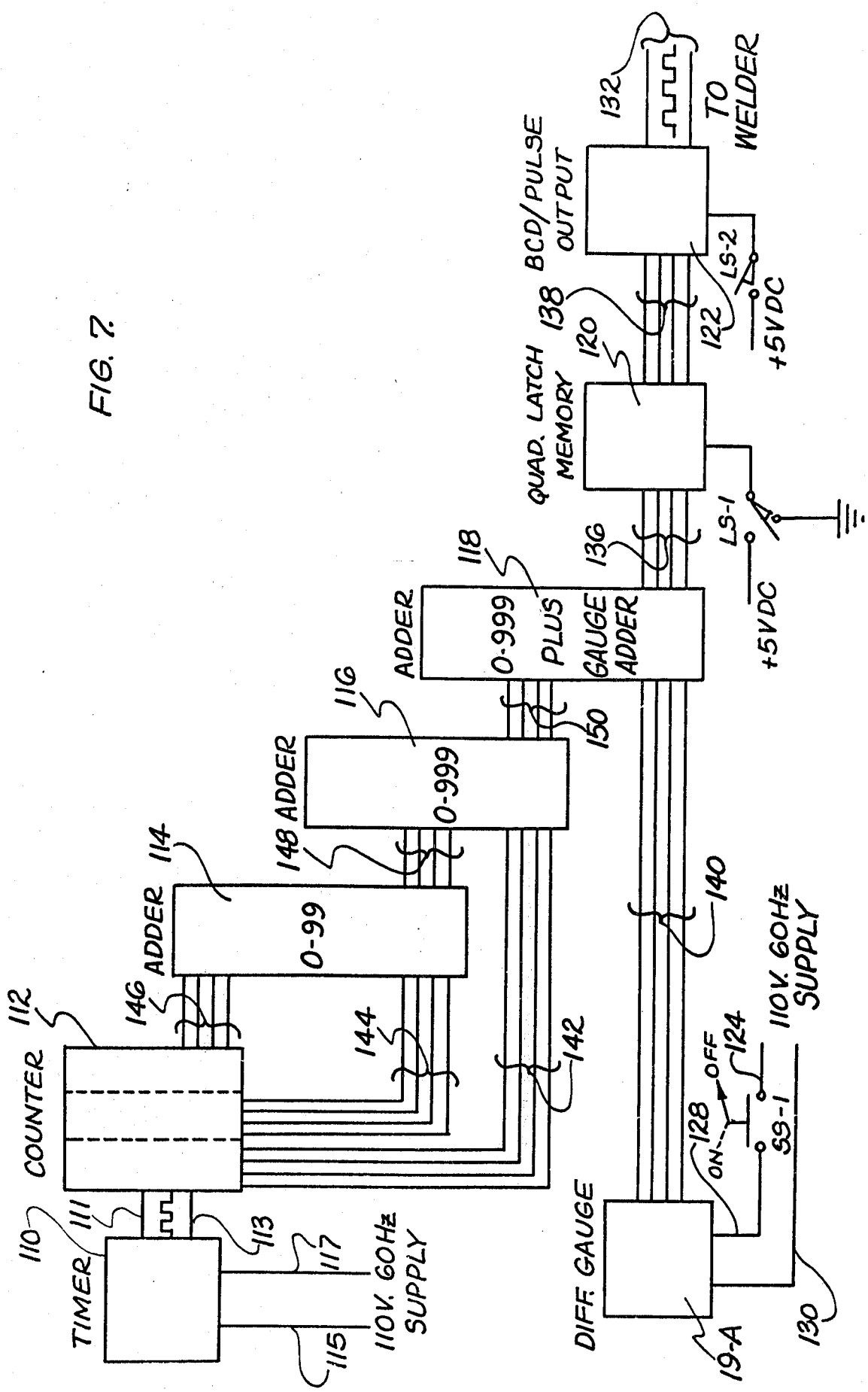

METHOD OF ASSEMBLING PIVOT JOINTS

REFERENCE TO CO-PENDING APPLICATION

This application is a continuation-in-part of our co-pending application Ser. No. 357,396 filed May 4, 1973, now abandoned.

BACKGROUND OF THE INVENTION

This invention relates generally to pivot joints and more particularly to a novel method for assembling ball-and-socket joints of the type used in automobile linkages or the like.

In general, the present invention consists of an unique method for automatically gauging the components of pivot joints and thereafter assembling the joints at high rates of production with precisely controlled internal end motion dimensions notwithstanding inherent variations in the dimensions of the components which necessarily must be tolerated, in high volume, low cost production operations.

More particularly, a typical pivot joint of the present invention comprises, for example, a pivotal ball or head member assembled between two seats in a cavity-forming housing portion that is closed with a closure-forming housing portion or cap. A spring for the takeup of wear is mounted within the housing portion between one of the seats and the cap. The two housing portions are then joined in a novel controlled manner so as to preciselly establish the desired optimum axial end motion.

PROBLEMS IN THE ART

It has been determined by laboratory tests and field service studies or prior pivot joints of this type that when such axial end clearance is present then axial motion of the internal components, with respect to the housing, will occur under rough road conditions causing internal hammering of the joint components with a resulting decrease in the fatigue life of the joint.

On the other hand, if the cap or upper housing portion is too tightly positioned against the internal components then excessive swivel torque values, or actual binding of the internal components will occur.

It has further been determined that when an optimum axial end clearance for example .010 thousandths of an inch is achieved on the joint construction of the present invention, and this must be achieved at the high rates of production required by the automobile industry, then the maximum in fatigue life is achieved at commercially acceptable production costs.

SUMMARY OF THE INVENTION

In accordance with the present invention the external housing portion and stacked internal elements of thepivot joints are subjected to an operation in a unique gauging apparatus which is adapted to sense the differential in height between the upper end or junction-forming edge portion of the housing and the top of the stacked internal elements.

The pivot joint is next closed by subjecting the lower housing portion, with the cap assembled thereon, to a welding operation in a welding apparatus which functions to burn-down the junction of the housing portions by a burn-down dimension proportional to the height differential detected by the previously mentioned sensing apparatus.

As a result, the finished pivot joints are characterized by a preselected proper internal end clearance or looseness which has been determined to be optimum for long operational life notwithstanding inherent variations in the above mentioned height of the lower housing portion as well as variations in the height of the stacked internal components which variations are ever present in the art due to limitations in obtaining precise accuracy inherent in the forming equipment used to fabricate the components as well as the variable build-up of tolerances inherent in stacking the internal components of the joint when fabricated at high rates of production that inherently result in limitations in precise dimensional control.

As another aspect of the present invention, the present method for closing pivot joints is characterized by a variation in the input of electrical energy being automatically controlled responsive to the above mentioned height differential detected by the sensing means at the previous station. This not only speeds up production but also eliminates the possibility of human error in determining such height differential and manually adjusting the electrical input to effect precise burn-down dimensions during the welding operation.

It is, therefore, an object of the present invention to provide a novel method for assembling pivot joints wherein the components are automatically gauged prior to the closing of the pivot joint so as to consistently provide finished assembled joints having uniform internal end motion or looseness notwithstanding variations in tolerances of the various component parts.

It is another object of the present invention to provide a novel method for assembling pivot joints by joining the housing portions of the joint at a fused junction wherein electrical energy output during fusing is automatically controlled in direct proportion to variations in previously sensed dimensions of the components so as to consistently establish a predetermined optimum end motion dimension.

It is a further object of the present invention to provide a novel method for assembling pivot joints which automatically controls the end motion in the finished joint thereby eliminating the possibility of human errors inherent in manually controlled assembly operations.

It is still another object of the present invention to provide a novel method for assembling pivot joints which includes a multiple station gauging and welding sequence of steps that include a unique electronic control system operative between a gauging step and a welding step for the controlled fusing of closures on pivot joint assemblies with the electrical energy applied during the welding operation being automatically varied in proportion to dimensional variations sensed during the gauging operation.

Further objects and advantages of the present invention will be apparent from the following description, reference being had to the accompanying drawings wherein preferred forms of embodiments of the invention are clearly shown.

BRIEF DESCRIPTION OF THE DRAWINGS

FIG. 7 is a diagrammatic view of an electronic control system of the gauging and welding apparatus of FIGS. 4 through 6.

DESCRIPTION OF THE PREFERRED EMBODIMENT

Figure 1:
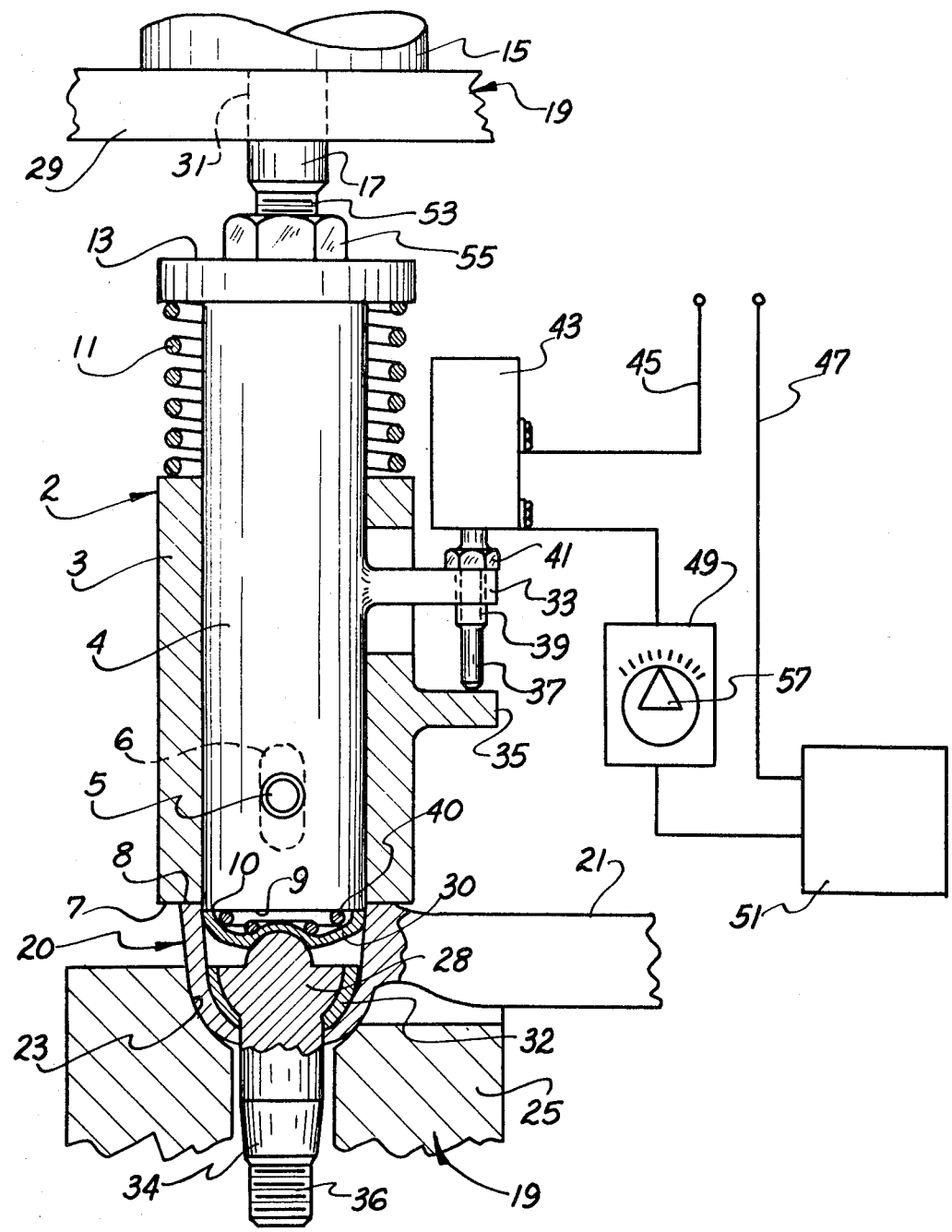
FIG. 1 is a side elevational view, partially in section, of an apparatus for gauging the components of pivot joints in accordance with the present invention.
Figure 3:
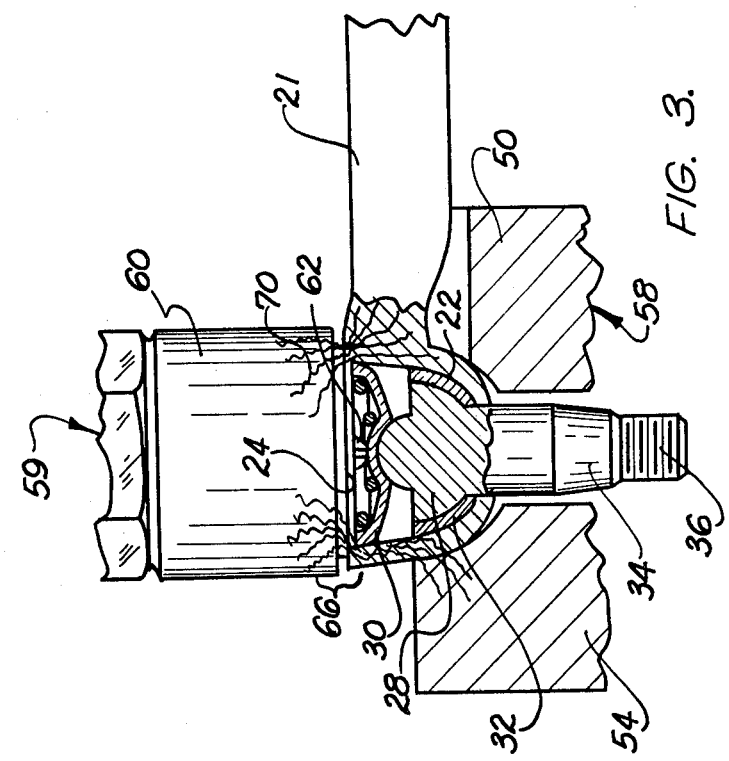
FIG. 3 is a second side elevational view partially in section of the apparatus of FIG. 2 and showing such apparatus in an energy applying configuration wherein the housing portions of the pivot joint are being fused together at a junction.
Figure 2:
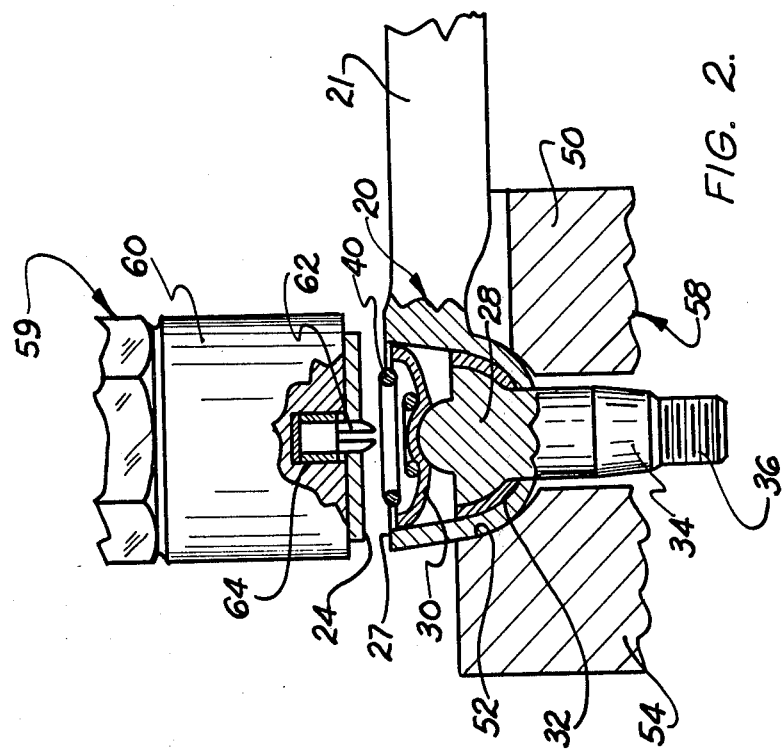
FIG. 2 is a side elevational view, partially in section, of an apparatus for closing pivot joints with the internal elements assembled therein, said apparatus being constructed in accordance with the present invention.

Referring in detail to the drawings, a pivot joint constructed in accordance with the present invention is illustrated in FIGS. 1-3 and comprises housing means indicated generally at 20 formed from a lower or cavity-forming housing portion 22 and an upper or closure-forming housing portion 24 which are integrally fused at a junction 66.

The pivot joint of FIGS. 1-3 further includes a pivotal head 28, an upper seat 30, and a lower seat 32, said internal components being formed of steel or other suitable material.

Head 28 includes a shank portion 34 provided with a threaded lower end 36 for attaching the pivotal head 28 to adjacent structure in operational use.

With continued reference to FIGS. 2 and 3, a preloaded spring 40 of the compression type is interposed between upper seat 30 and upper housing portion 24. Such spring functions to take up normal wear during operational use.

Reference is next made to FIG. 1 which illustrates a sensing or detecting apparatus for automatically determining the height differential between the upper junction edge 8 of a lower housing portion 20 and the stacked dimension of the internal elements including the pivotal head 28, bearing member 32, and seat 30.

Such sensing means comprises a frame indicated generally at 19 that includes a lower frame portion 25 and an upper frame portion 29 which frame portions are rigidly mounted with respect to one another.

Lower housing portion 22 is supported by lower frame portion 25 so as to be rigidly positioned in recess 23 with the stem 34 projecting freely downwardly through a bore in lower frame portion 25.

Referring again to FIG. 1, upper frame portion 29 supports a fluid actuated cylinder 15 including an extendable rod 17 for vertically actuating a central sensing element 4 of rod-shaped configuration. When the rod 17 of the power cylinder is extended downwardly the lower end 9 of sensing element 4 will engage the upper edge 10 of seat 30.

At the same time an outer sleeve 2 forming a second sensing element 3 is also moved downwardly into engagement with the upper junction forming edge 8 of lower housing portion 22.

A compression spring 11, interposed between the top of tubular sensing element 3 and a spring retaining shoulder 13, serves to resiliently urge outer sensing element 3 downwardly into form engagement with junction forming edge 8 of lower housing portion 22.

It should be mentioned that the two sensing elements 3 and 4 are retained in assembled relationship by a pin 5 disposed in a slot 6, with the pin being carried by the rod element 4 and the slot being formed in the wall of tubular sensing element 3. A nut 55 is mounted on a threaded end 53 of cylinder rod 17 so as to lock rod 17 with respect to the sensing element assembly at various adjusted positions.

Referring again to FIG. 1 inner sensing element 4 carries a sensing protrusion 33 extended outwardly through a slot in the tubular wall of outer sensing element 3 so as to be unrestricted with respect to following the vertical movement thereof.

Protrusion 33 supports an electrical-mechanical transducer indicated generally at 43 which includes a movable pin 37 extended downwardly from a fixed sleeve 39 and in engagement with a relatively movable indicating shoulder 35 integrally formed with outer sensing element 3.

Transducer 43 is generally of a type which varies the resistance of effecting the electrical output from lines 45-47 which lines are connected with a source of electrical energy. Such output is varied by changing the resistance of a conventional internal coil and core assembly, not illustrated, mounted within the transducer means 43.

Referring again to FIG. 1, a welding head for a resistance type welding apparatus, the controlled electrodes of which are shown in FIGS. 2 and 3, is indicated at 51 and, in general, includes a manual or electrically powered control knob for varying the electrical energy imposed by the welding apparatus on the welded junctions 66 of FIG. 3. In this instance, welding control 51 includes an electric motor or other electronic device, the rotation of which is effected by the electrical control signal from electrical mechanical transducer 43 responsive to variations in the previously mentioned height differential.

Hence, it will be understood that when the relative height differential between the protrusion 33 and detector shoulder 35 varies responsive to variations in dimensions of the parts, then the electrical resistance imposed by transducer 43 on the circuit is varied whereby controller head 51 is varied such that the magnitude of electrical energy output is precisely applied to the particular pivot joint with its specific dimensions of elements.

It should be mentioned that the circuit of FIG. 1 preferably includes a range controller 49, including a manual adjuster 57, which can be used, upon experimentation, with any particular design or size of pivot joint to vary the magnitude of the electronic signal delivered to welding head controller 51, responsive to any given height differential mechanical sensed by the transducer 43, for the particular characteristics of the particular design being fabricated.

Reference is next made to FIGS. 2 and 3 which illustrate a typical apparatus for assembly of the pivot joint of FIG. 1 wherein it will be seen that the components of such joint are assembled by application of resistance heating and pressure to upset and fuse the housing portions in a controlled manner.

In preparing the recess-forming housing portions 22 for assembly in accordance with the present invention the sequence of operation is as follows:

1. Forge to shape
2. Coin to finish the inner surface
3. Pierce the bottom opening
4. Face off top surface 27 to establish a predetermined dimension A greater than the desired finished dimension B
5. Mill the bottom opening to establish proper angularity for required range of motion of shank 34
6. Assemble internal components in recess-forming housing portion 22
7. Gauge the height dimensions of housing portion 22 and stacked internal elements 28, 30 and 32 in the sensing means of FIG. 1
8. Apply heat and pressure in a controlled manner to upset and fuse housing portions In preparing the lower housing portions such as 22 for conventional assembly the sequence of operations is as follows:

1. Forge to shape
2. Coin to finish the inner surface
3. Pierce the bottom opening
4. Turn, counterbore and face to prepare a recess, not illustrated, for receiving a closure-forming housing portion
5. Mill the bottom opening to establish proper angularity for required range of motion of shank 34
6. Assemble internal components in recess-forming housing portions 22
7. Attach upper housing portion by spinning, curling, or staking the upper edge of the lower housing portion so as to overlie the peripheral edge of the upper housing portion and thereby retain same FIG. 2 illustrates a portion of an apparatus 59 for fabricating pivot joints which includes a lower electrode 50 for positioning lower housing portion 22 with an inner surface 52 of said electrode conforming in shape with an outer surface 54 of said lower housing portions.

The apparatus 59 for closing flexible joint 20 further includes a movable upper electrode 60 which serves to position the previously mentioned closure-forming housing portion 24, as well as means for applying pressure to the housing portions.

As seen in FIG. 2, upper electrode 60 includes a split pin 62 which is insulated from electrode 60 by a layer of insulation 64.

The above-mentioned lower electrode 50 and upper electrode 60 are energized and pressurized by an electric resistance projection welding machine, of a press type, which may be air operated and provided with automatic voltage control. With a machine of this type, and with the electrodes constructed in accordance with the present application, the heating application of pressure, and upsetting of metal are concentrated in a precisely controlled manner in a localized zone in the housing portions of their junction.

Reference is next made to FIG. 3 which illustrates the same upper electrode 60, and lower electrode 50 in a pressure applying configuration wherein the upper housing portion or cap 24 has been brought into engagement with a peripheral upper edge of lower housing portion 22.

In this configuration of FIG. 3, the upper and lower electrodes 60 and 50 have been energized to upset metal and fuse the junction of a lower peripheral edge of cap 24 and an upper inner peripheral edge of lower housing portion 22.

It is important to note that the elements are so related that electrical energy is concentrated at an annular zone at said junction as is indicated by the diagrammatic lines representing current flow as seen at 70 in FIG. 3.

FIG. 2 illustrates the previously mentioned lower positioning electrode 50 and an upper positioning electrode 60, with said electrodes serving to respectively position lower cavity-forming housing portion 22 and upper closure-forming housing portion 24. Here it should be mentioned that lower cavity positioning electrode 50 includes inner surface 52 which substantially conforms in shape with outer surface 52 of said lower housing portion. Such surface conformation makes the metal of the lower housing portion 22 and the electrode 50 in such intimate, conductive contact that the electrical energy transmitted to junction 66 can be most efficiently applied to the upsetting and fusing of such junction.

FIG. 3 illustrates another step in the present invention wherein the upper electrode 60 has been moved downwardly so as to bring upper housing portion 24 into engagement with lower housing portion 22. At this point the previously mentioned upsetting and fusing apparatus 59 is energized to thereby concentrate its heating effect at the annular junction 66 between the two housing portions. At the same time pressure is applied to the joint by the apparatus such that upper electrode 60 moves upper housing portion 24 downwardly for a dimension equal to a predetermined dimension.

Figure 4:
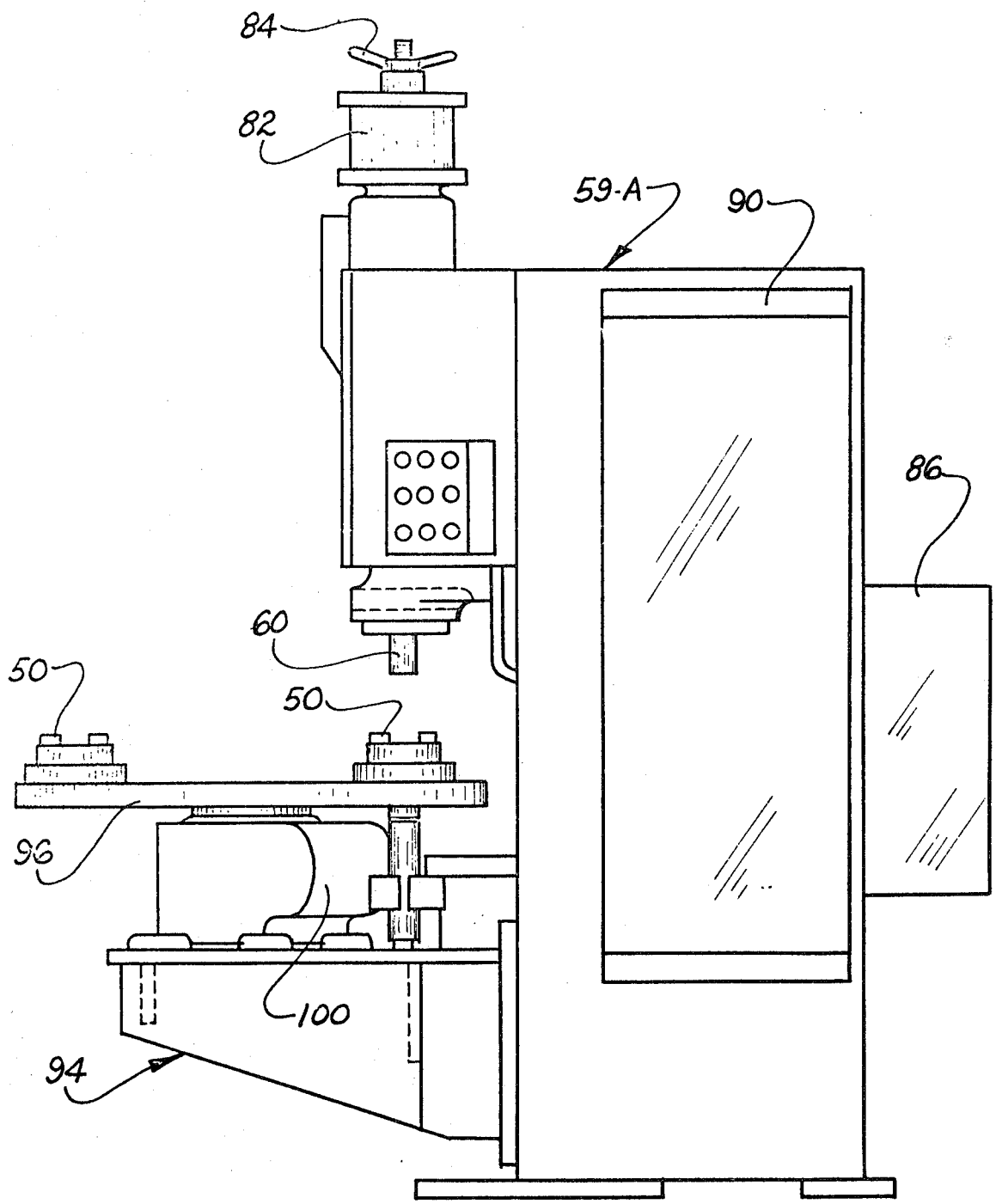
FIG. 4 is a side elevational view of a gauging and welding apparatus constructed in accordance with the present invention.
Figure 5:
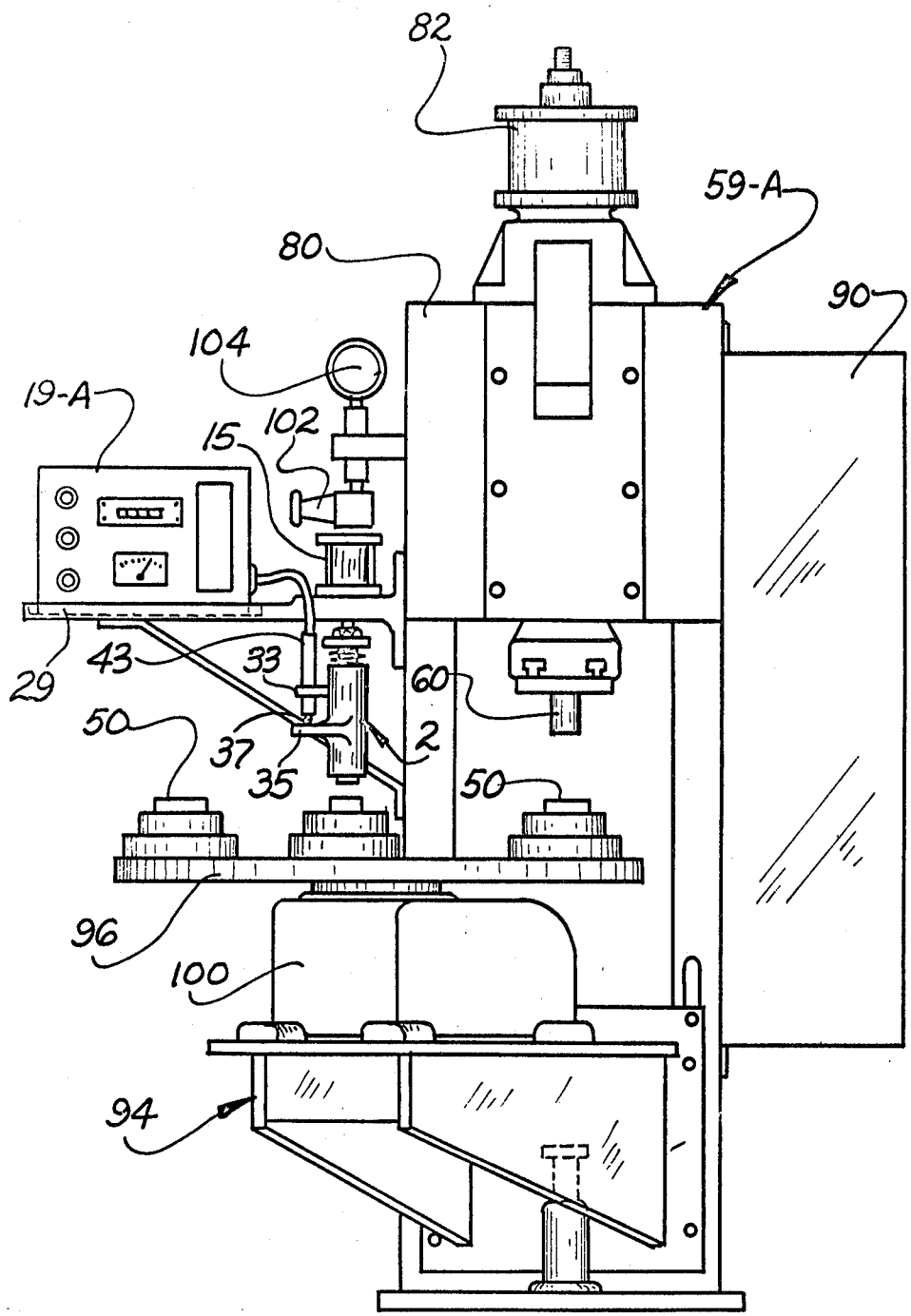
FIG. 5 is a front elevational view of the apparatus of FIG. 4.
Figure 6:
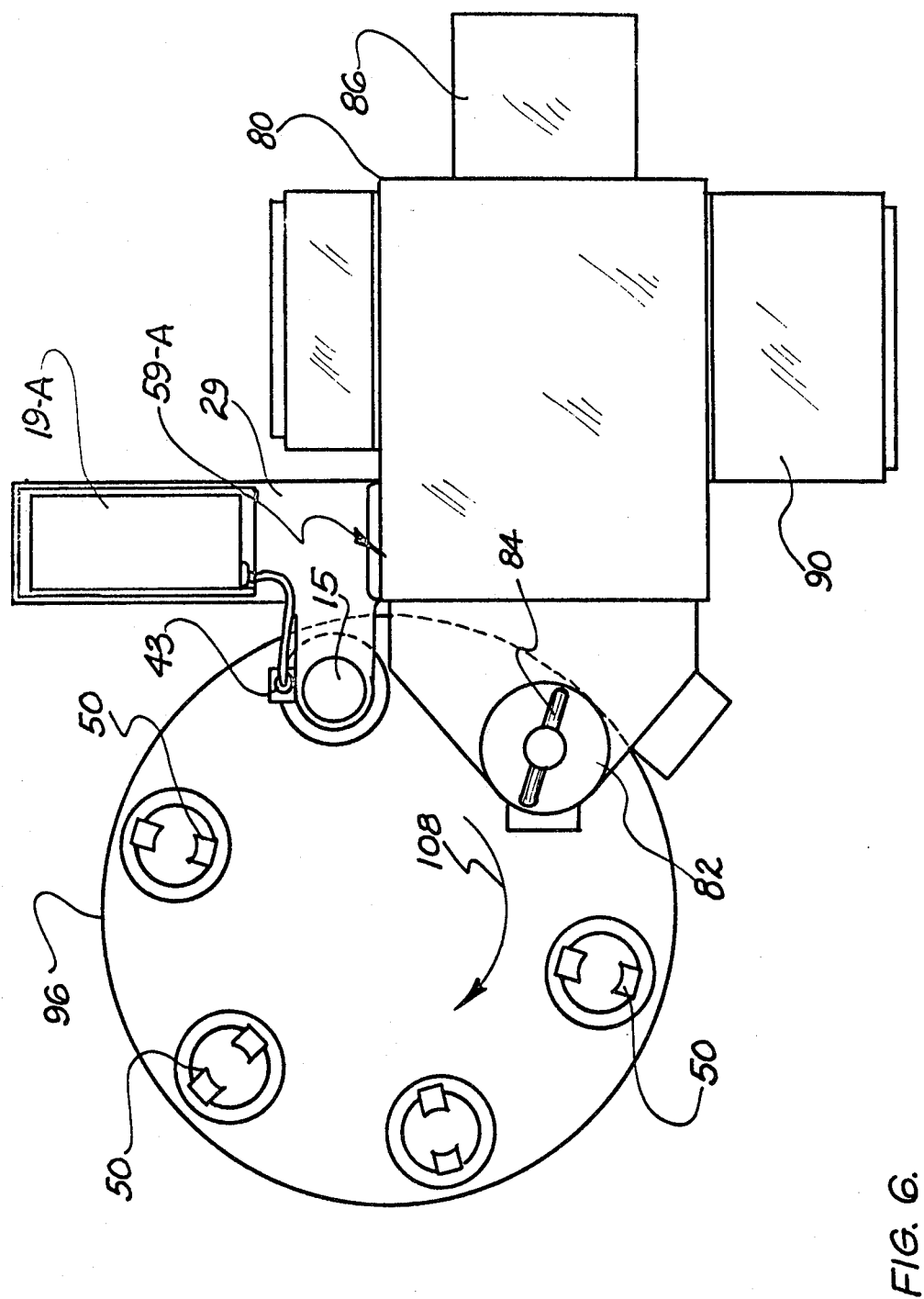
FIG. 6 is a top elevational view of the apparatus of FIG. 4.

Reference is next made to FIGS. 4–6 which illustrate a modified apparatus constructed in accordance with the present invention which apparatus comprises a press type electric resistance projection welding machine. Machines of this general type without the modifications taught herein are well known in the welding art and in general comprise an upright frame 80 which supports upper and lower electrodes such as the ones shown at 60 and 50 respectively.

On conventional welding machines of this type a lower electrode such as 50 is normally mounted at a fixed position on the machine frame and upper electrode 60 can be raised and lowered by the operator's actuation of an adjustable air cylinder 82, the vertical adjustment of such cylinder being manipulatable by the actuation of threaded collar 84. Also, with conventional machines the electrical energy input to the electrodes is selectively established by the operator by the manual setting of a power control dial or the like.

In general, the machine 59-A further includes a transformer 86 and welder control section or variable welding energy controller 90. The latter contains electrical components for varying the power delivered to the electrodes 60-50 with the control being normally of the manual type. Hence welder control section 90 varies the electrical welding energy delivered to the work pieces and includes two ignitrons or large capacitors which are triggerable devices. Such control section 90 including ignitrons are well known to any one skilled in the art of electric welding control apparatus.

It should be mentioned that the welding machine 59-A is, in accordance with the present invention, provided with a dial feed apparatus indicated generally at 94 which includes a turntable 96 provided with a plurality of individual lower electrode stations 50 which stations are sequentially indexed first to a gauging or sensing means 19-A of the same general type illustrated in FIG. 1 and then to the previously mentioned welding electrode 60.

It should be mentioned that dial feed apparatus 94 is rotated by an index drive unit 100 mounted on the lower portion of welder frame 80 which drive unit operates to sequentially move and stop each of the lower electrodes 50 through the gauging and welding stations mentioned above.

It should be further mentioned that welding machine 59-A includes a conventional weld pressure regulator 102 which consists of an air control valve and air gauge 104 for manually varying the pressure delivered to the air cylinder 82.

As viewed in the top view of FIG. 6 turntable 96 is rotated in a clock-wise direction as depicted by the arrow 108.

Reference is next made to FIG. 7 which illustrates diagrammatically an electronic control circuit for automatically controlling the electrical energy input to the electrodes 50 – 60 of the previously described welding machine. As previously stated, the amount of electrical energy delivered to weld each ball joint assembly is established in proportion to the height differential dimension determined by a sensing means or gauge 19 of the type described in the discussion of FIG. 1.

In the system of FIG. 7, however, the transducer 43 and controllers 49 and 51 generally discussed in connection with FIG. 1 are omitted and replaced by a differential gauge 19-A and by the other electronic elements shown in the circuit of FIG. 7.

A suitable differential gauge 19-A, FIG. 7, is the Federal digital ellectronic control system Model 135B-91 which inclulds an electronic probe, such as Federal electronic probe EHE-1069 made for use with the above mentioned Federal digital electronic control. Such electronic probe is designated at 43-A in FIGS. 4 through 6 and serves the same function as the previously described electro-mechanical transducer 43 of FIG. 1. The function of the digital electronic control 19-A is to provide a BCD (binary coded decimal) output signal such that the number of pulses released by differential gauge 19-A during each gauging operation of each pivot joint assembly is varied in accordance with the height differential sensed by the previously described height differential sensing means or gauge 19, FIG. 1.

As seen in FIG. 7, digital electronic control 19-A is connected to a 110 V 60 Hz power supply by wires 128 and 130 and is provided with an on-off switch SS-1. Also, the output from digital electronic control 19-A is delivered via wire loom 140 to an adder 118 as will later be described.

With continued reference to FIG. 7, the control circuit further includes an electronic timer 110 which is provided for the purpose of producing a BCD pulse output which is manually set so as to be the proper minimum pulse output for the necessary welding power range for the particular physical characteristics of the pivot joint assembly being manufactured during the particular run. A suitable electronic timer for particing the present invention is exemplified by the Shawnee 333 wired as a repeat cycle pulse generator. As seen in FIG. 7, the electronic timer 110 is connected to a 110 V 60 Hz power supply by wires 115 and 117.

The manually set pulse output from electronic timer 110 is delivered to a counter 112 by the wires 111 and 113. The function of counter 112 is to count the pulses in the BCD output from electronic timer 110. A suitable counter for practicing the present invention is a Motorola programmable modulo-N hexadecimal counter. Three of such units are required, one each in hundredths, tenths, and units as shown in the control diagram of FIG. 7.

The output from counter 112 is delivered to three four-bit binary full adders 114, 116, and 118. Suitable adders for performing the function of the circuit of the present invention are Motorola Model MC7483 four-bit binary full adders. These devices form the logical addition of two four-bit binary numbers. The sum outputs for each bit and the carry from the fourth bit are provided.

The adders 114, 116, and 118 are connected to the electronic counter 112 by the wire looms 146, 144, and 142. The last 0–999 plus adder 118 is connected to adder 116 by wire loom 150 and also to the previously described differential gauge 19-A by the wire loom 140. Hence it will be understood that adder 118 receives both the manually set fixed signal from timer 110 and the variable signal from differential gauge 19-A.

The output from the previously described adder 118 is delivered to a quad latch memory device 120 with a suitable memory device for the subject circuit being a Motorola quad latch MC4037. Such quad latch 120 functions as a memory device to store signals on one side while previous signals are being transmitted from the other. In general, this monolithic device consists of four latch circuits with active pullup networks for high capacitive load drive capability. Separate data inputs and a comomon strobe input are provided. Information present on the data inputs prior to the negative edge of the strobe input will be stored in the latch. When the strobe input is high the Q output will follow the data input.

It should be mentioned that quad latch 120 is connected to a +5VDC power supply by an on-off switch LS-1.

The output signal from quad latch 120 is delivered to a BCD/pulse output 122 by a wire loom 138. This device 122 functions to convert the BCD signal to pulses which are delivered to the conventional electric welder control 90 by the wires 132. A suitable BCD/pulse output for use in the circuit of the present invention consists of Texas Instrument Model SM74L72. It should be mentioned that the number of pulses delivered to the welder control, determined as previously stated, establishes the power setting of the welding machine for the particular pivot joint assembly being presented to upper electrode 60 with the magnitude of the welding power output being established by the electronic control citcuit of FIG. 7 so as to effect the appropriate burn-down at the junction 66 of the lower housing portion 22 and closure 24 as seen in FIG. 3. This establishes the proper predetermined clearance between the internal components of the joint.

In operation, a machine operator places pivot joint assemblies, such as seen in FIGS. 2 and 3, into the cavities of the lower electrodes 50 at the station just prior to the gauging apparatus 19-A. The table is next indexed to position an assembly in the gauge apparatus 19 where the particular assembly is first gauged. Turntable 96 is next indexed in the direction of arrow 108, FIG. 6, to move the gauged assembly to the station beneath upper electrode 60. The air cylinder 82 next lowers the upper electrode 60 down into contract with the upper rim of the asssembled pivot joint. The welding machine power control is adjusted and energized in accordance with the signal delivered from control circuit of FIG. 7 which includes the standard predetermined signal released from the manually set timer 110 as well as the signal from the differential guage 19-A which latter signal represents a signal proportional to the height differential previously determined by gauge means 19 when the pivot joint assembly being welded was present in such gauging means. It should be mentioned that the previously described quad latch memory device 120 functions to store the signals obtained when the pivot joint assembly is present in the gauging station and subsequently releases such signal to the welder output control 90 when the gauged pivot joint assembly is being fused at the welding station.

While the forms of embodiments of the present invention as herein disclosed constitute preferred forms, it is to be understood that other forms might be adopted:

What is claimed is:

1. The steps in the method of assembling pivot joints of the type that include first and second housing portions joined together at junction forming edges, and stacked internal elements including a pivotal head within said housing portions, said pivot joints being characterized by a predetermined dimensional tolerance between the internal components of the joints, said method comprising assembling said internal elements in stacked relationship in one of said housing portions; detecting the height differential between the junction forming edge of one of said housing portions and the top of said stacked internal elements; and applying electrical energy to join said housing portions at a vertically displaced junction, the dimension of the displacement of said junction being proportional to said detected height differential.

2. The steps in the method of assembling pivot joints of the type that include first and second housing portions joined together at junction forming edges, and stacked internal elements including a pivotal head within said housing portions, said pivot joints being characterized by a predetermined dimensional tolerance between the internal components of the joints, said method comprising assembling said internal elements in stacked relationship in one of said housing portions; detecting the height differential between the junction forming edge of one of said housing portions and the top of said stacked internal elements; positioning the other of said housing portions in contiguous relationship with said one housing portion at an unfused junction; applying electrical energy to effect burndown of said junction forming edges to a fused junction located a burn-down dimension from the location of said unfused junction; and varying the input of electrical energy and resulting burn-down dimension responsive to variation in said detected height differential.

3. The method defined in claim 1 wherein said detecting is effected mechanically, said electrical energy is varied by an electronic signal, and said electronic signal is transduced from said mechanical detection.

4. The method defined in claim 2 wherein said detecting is effected mechanically, said electrical energy is varied by an electronic signal, and said electronic signal is transduced from said mechanical detection.

5. A method for the continuous production of pivot joints of the type that a lower housing portion, a closure portion, and internal components, said pivot joints being characterized by a predetermined dimensional tolerance between the internal components of the joints, said method comprising in combination, variably controlling the welding energy supplied to said joints by means of a variable welding energy controller; gauging said pivot joints at a gauging means to determine the height differential between (1) said lower housing portion and (2) said internal components and closure portion; welding the closure on said pivot joints at a welding station; and utilizing an electronic circuit operative between said gauging means and said variable welding energy controller for delivering predetermined amounts of energy to said welding station to burn down the junction between said portions and thereby establish within said pivot joints and predetermined clearance between said internal components of said joints.

6. The method according to claim 5 wherein said electronic circuit includes a memory component for storing the signal determined at the gauging means and for subsequently energizing said variable welding energy controller to cause said controller to deliver the appropriate amount of welding energy at the welding station as dictated by said signal when each pivot joint is delivered thereto.

* * * * *